US012672635B2

(12) United States Patent
Valdez et al.

(10) Patent No.: US 12,672,635 B2
(45) Date of Patent: Jul. 7, 2026

(54) HVAC BACKPACK FOR MODULAR ANIMAL CRATE

(71) Applicants: Ryan Patrick Valdez, Napa, CA (US); Riley A Robbins, Drytown, CA (US)

(72) Inventors: Ryan Patrick Valdez, Napa, CA (US); Riley A Robbins, Drytown, CA (US)

( * ) Notice: Subject to any disclaimer, the term of this patent is extended or adjusted under 35 U.S.C. 154(b) by 0 days.

(21) Appl. No.: 18/913,767

(22) Filed: Oct. 11, 2024

(65) Prior Publication Data

US 2025/0057105 A1 Feb. 20, 2025

Related U.S. Application Data

(60) Provisional application No. 63/519,591, filed on Aug. 15, 2023.

(51) Int. Cl.
A01K 1/00 (2006.01)

(52) U.S. Cl.
CPC .......... A01K 1/0052 (2013.01); A01K 1/0064 (2013.01); A01K 1/0076 (2013.01)

(58) Field of Classification Search
CPC .. A01K 1/0047; A01K 1/0052; A01K 1/0058; A01K 1/0064; A01K 1/007; A01K 1/0076; A01K 1/0082
See application file for complete search history.

(56) References Cited

U.S. PATENT DOCUMENTS 1,975,316 A * 10/1934 Ferris ................... A01K 1/0064
D23/371
D214,566 S 7/1969 Swinney
(Continued)

FOREIGN PATENT DOCUMENTS

DE 10148758 A1 * 4/2003 ............. A01K 31/06
DE 102017001377 A1 * 8/2018 ............ F24F 5/0035
(Continued)

OTHER PUBLICATIONS

Screen capture from YouTube video clip entitled "Lean about the Kool Kennel", "1 page, uploaded on Aug. 27, 2008 by user" nwunit. Retrieved from Internet: <https://www.youtube.com/watch?v=X7Cilqpieew> (Year: 2008).*

(Continued)

*Primary Examiner* — Peter M Poon
*Assistant Examiner* — Carly W. Lynch
(74) *Attorney, Agent, or Firm* — Squire Patent Consulting & IP Law LLC; Brendan Squire

(57) ABSTRACT

A heating, ventilation, and air conditioning (HVAC) backpack for modular animal crate is disclosed. The HVAC is configured to provide a climate-controlled environment within the modular animal crate. The HVAC backpack includes a framework that supports the components of the HVAC unit and mounting to the modular crate. The HVAC backpack may include a control module with a touchscreen display to receive control inputs for operation of the HVAC unit and provide a visual display of conditions within the modular crate. One or more sensors carried by the HVAC backpack monitor air quality delivered to the modular animal crate. The control module may include alerting the user to conditions within the crate. A communications module allows for remote control operation of the HVAC backpack and receiving alerts to conditions within the modular crate.

21 Claims, 7 Drawing Sheets

(56) References Cited

U.S. PATENT DOCUMENTS

| | | | | |
|---|---|---|---|---|
| 3,464,388 | A * | 9/1969 | Stout | A01K 1/031 |
| | | | | 261/92 |
| 3,490,417 | A | 1/1970 | Swinney | |
| 4,056,048 | A * | 11/1977 | Milroy | F24F 11/0001 |
| | | | | 454/273 |
| 4,512,393 | A * | 4/1985 | Maendel | A01K 1/0076 |
| | | | | 165/905 |
| 4,811,656 | A * | 3/1989 | Meendering | A01K 1/0058 |
| | | | | 454/307 |
| D364,712 | S | 11/1995 | Murphy et al. | |
| 5,520,580 | A * | 5/1996 | Showalter | F24F 13/10 |
| | | | | 454/273 |
| 5,887,436 | A * | 3/1999 | Duddleston | F25B 21/02 |
| | | | | 119/500 |
| D445,222 | S | 7/2001 | Ross | |
| 6,257,171 | B1 * | 7/2001 | Rivard | A01K 1/031 |
| | | | | 119/419 |
| 7,004,832 | B2 | 2/2006 | Thomas | B60H 1/00364 |
| | | | | 454/94 |
| D546,005 | S | 7/2007 | Harper et al. | |
| D555,292 | S | 11/2007 | Harper et al. | |
| D615,251 | S | 5/2010 | Scherbing | |
| 8,141,518 | B2 * | 3/2012 | Pierpont | A01K 31/07 |
| | | | | 119/473 |
| D671,691 | S | 11/2012 | Neilan | |
| D760,447 | S | 6/2016 | Edmonds | |
| D768,941 | S | 10/2016 | Edmonds | |
| D967,552 | S | 10/2022 | Valdez et al. | |
| 2001/0032544 | A1 * | 10/2001 | Taylor | A01K 1/0107 |
| | | | | 96/19 |
| 2002/0023594 | A1 * | 2/2002 | Greene, Jr. | A01K 1/0245 |
| | | | | 119/496 |
| 2002/0092477 | A1 | 7/2002 | Ross | |
| 2004/0134444 | A1 * | 7/2004 | Shiever | A01K 1/0245 |
| | | | | 119/496 |
| 2008/0060586 | A1 * | 3/2008 | Lewis, Jr. | A01K 1/0047 |
| | | | | 119/500 |
| 2009/0139154 | A1 * | 6/2009 | Aderman | A01K 1/0058 |
| | | | | 52/95 |
| 2010/0175631 | A1 * | 7/2010 | Bennatt | A01K 1/035 |
| | | | | 119/472 |
| 2010/0192870 | A1 | 8/2010 | Wood | |
| 2012/0199080 | A1 * | 8/2012 | Siddons | A01K 1/033 |
| | | | | 119/448 |
| 2015/0034018 | A1 | 2/2015 | Edmonds et al. | |
| 2015/0060011 | A1 * | 3/2015 | Chan | E04B 1/80 |
| | | | | 165/53 |
| 2017/0097169 | A1 * | 4/2017 | Azevedo | G05B 15/02 |
| 2019/0216045 | A1 * | 7/2019 | Rodriguez-Palacios | A01K 1/0245 |
| 2020/0113153 | A1 * | 4/2020 | Yoo | A01K 1/0076 |
| 2023/0225285 | A1 * | 7/2023 | Levin | A01K 1/0245 |
| | | | | 119/500 |
| 2023/0292696 | A1 * | 9/2023 | Nelson | A01K 1/035 |
| | | | | 119/496 |
| 2024/0225386 | A1 * | 7/2024 | Shin | A47L 9/0072 |
| 2024/0334895 | A1 * | 10/2024 | Mohr | A01K 1/0064 |

FOREIGN PATENT DOCUMENTS

| | | | | | |
|---|---|---|---|---|---|
| GB | 2397482 | A * | 7/2004 | | A01K 67/30 |
| KR | 0156292 | B1 * | 10/1998 | | F24F 8/60 |
| KR | 20090046337 | A * | 5/2009 | | A01K 1/0064 |
| KR | 20130104887 | A * | 9/2013 | | A01K 1/031 |
| KR | 20160141030 | A * | 12/2016 | | A01K 1/0064 |
| KR | 102365040 | B1 * | 2/2022 | | A01K 1/0052 |
| KR | 102558394 | B1 * | 7/2023 | | A01K 1/0064 |
| WO | WO-9710706 | A1 * | 3/1997 | | A01K 1/0035 |
| WO | WO-2010054257 | A2 * | 5/2010 | | A01K 1/031 |

OTHER PUBLICATIONS

Petmate Sky Kennel Pet Carrier, available in Amazon.com, date first available Jun. 10, 2010 [online], [site visited Feb. 16, 2022], Available from the internet URL: https://www.amazon.com/dp/B00AAPGA2W/ref=cm_sw_em_r_mt_dp_ABC2KK1NA9GC3DBMBSOA?th=1 (Year: 2010).

* cited by examiner

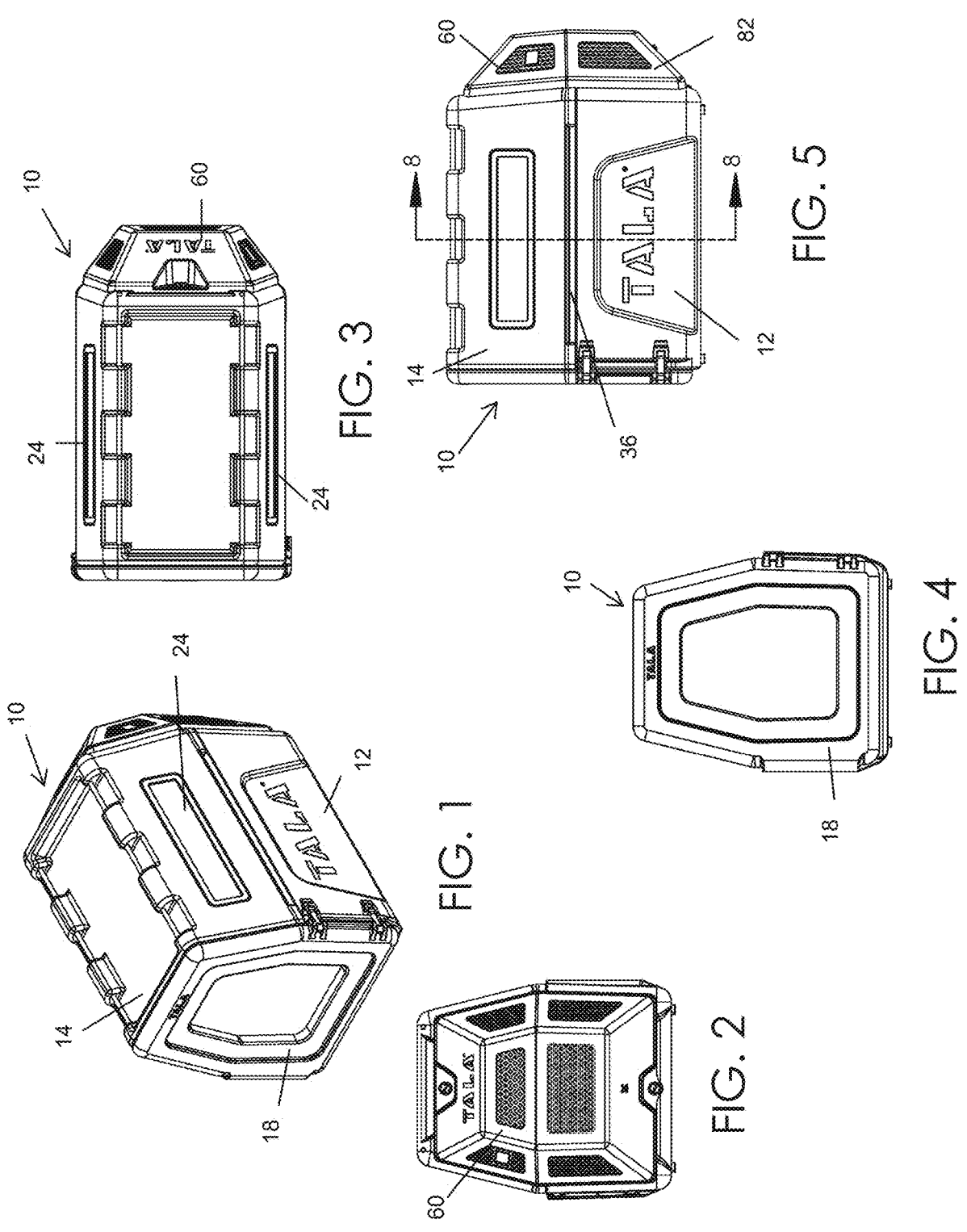

HVAC BACKPACK FOR MODULAR ANIMAL CRATE

CROSS-REFERENCE TO RELATED APPLICATION

This application claims the benefit of priority of U.S. provisional application No. 63/519,591, filed Aug. 15, 2023, the contents of which are herein incorporated by reference.

BACKGROUND OF THE INVENTION

The present invention relates animal shelters and containment systems, commonly referred to as an animal crate, and more particularly to climate control systems animal crates.

Animals and pets are subject to dangerous temperatures around the world. Even with a shelter, thousands of pets are killed every year from overheating or freezing.

Some people have an issue traveling with their pets in their vehicle due to excess animal hair, damage to the vehicle, as well as the pet's distractive activity and noises. Another issue may arise when someone is in a situation where they have to go into a store or any place away from their vehicle.

While there are several animal crates available, they are not sufficiently insulated, climate controlled, versatile, or durable to withstand the elements and/or the rigors of travel. Likewise, these crates do not allow for attachments to the inside to monitor temperature, cameras, and other features.

As can be seen, there is a need for improved apparatus for sheltering, containing, and transporting animals.

BRIEF DESCRIPTION OF THE DRAWINGS

FIG. 1 is a perspective view of the animal crate.

FIG. 2 is a rear elevation view thereof, showing the HVAC backpack.

FIG. 3 is a top plan view thereof.

FIG. 4 is a front elevation view thereof.

FIG. 5 is a right-side elevation view thereof.

Figures 9, 10, 11, 12, 13:
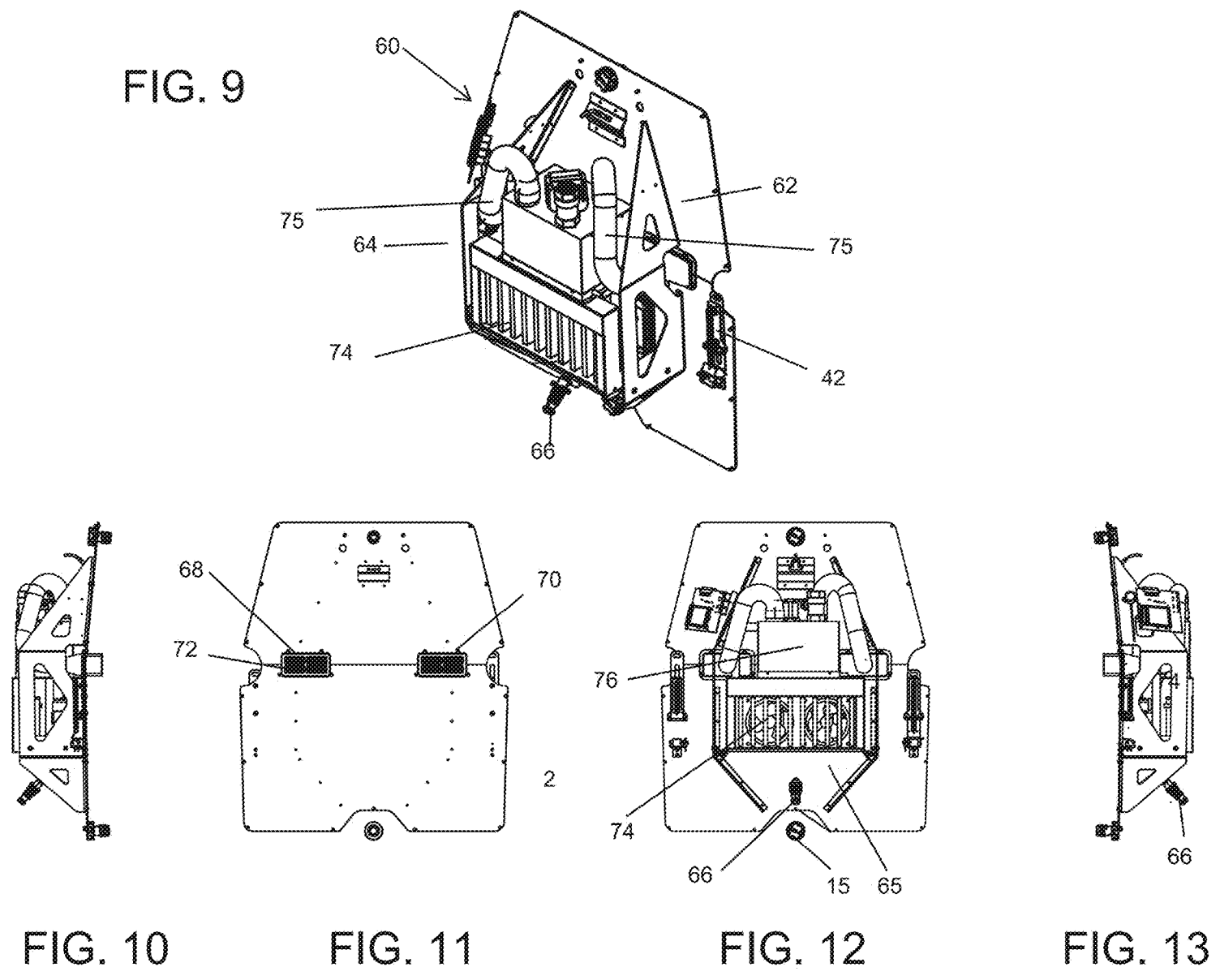

FIG. 9 is a rear perspective view of the HVAC backpack with cover removed.

FIG. 10 is a left side elevation view of the HVAC backpack.

FIG. 11 is a front elevation view of the HVAC backpack.

FIG. 12 is a rear elevation view of the HVAC backpack.

FIG. 13 is a right-side elevation view of the HVAC backpack.

DETAILED DESCRIPTION OF THE INVENTION

Figure 6:
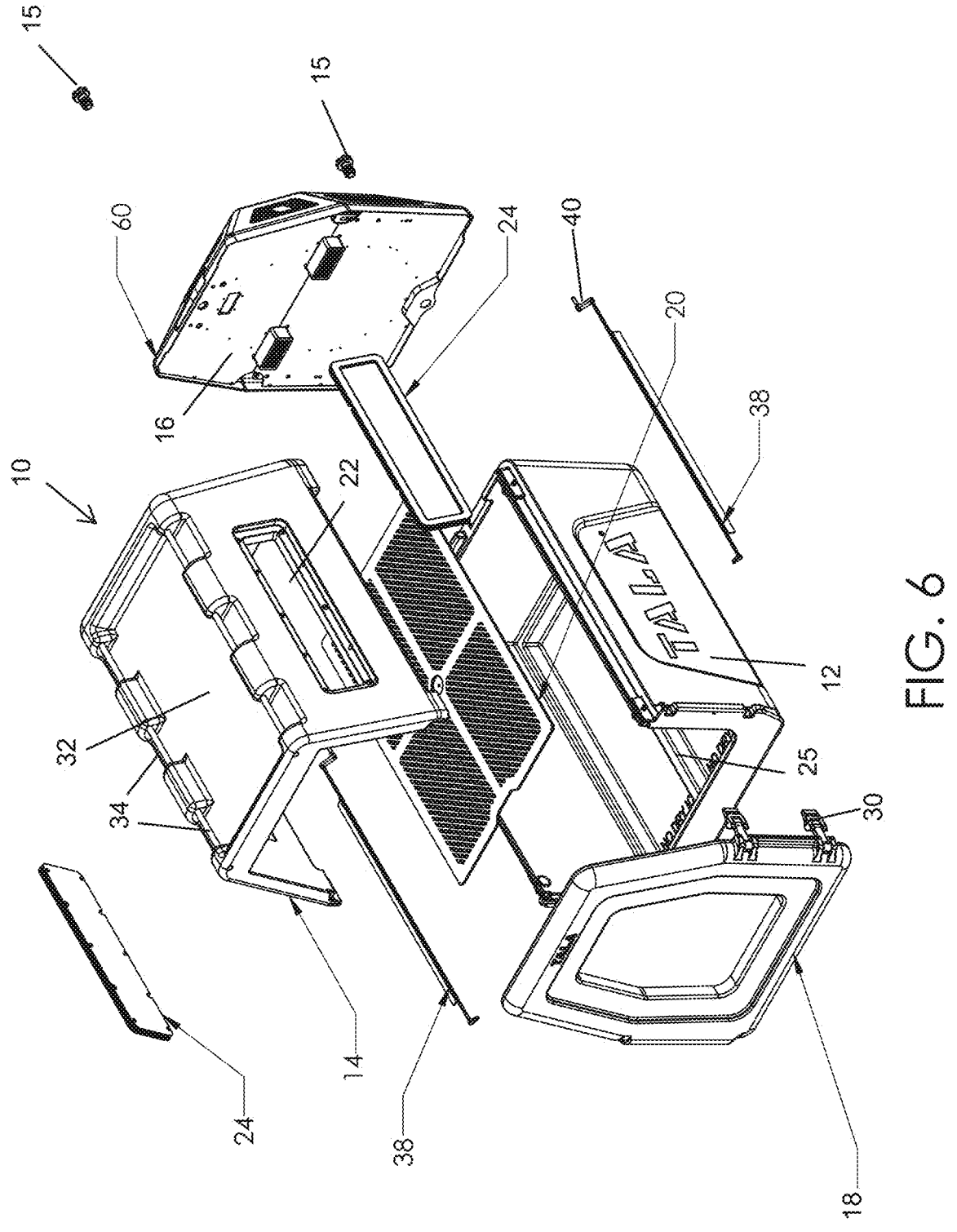
FIG. 6 is an exploded front perspective view thereof.
Figure 7:
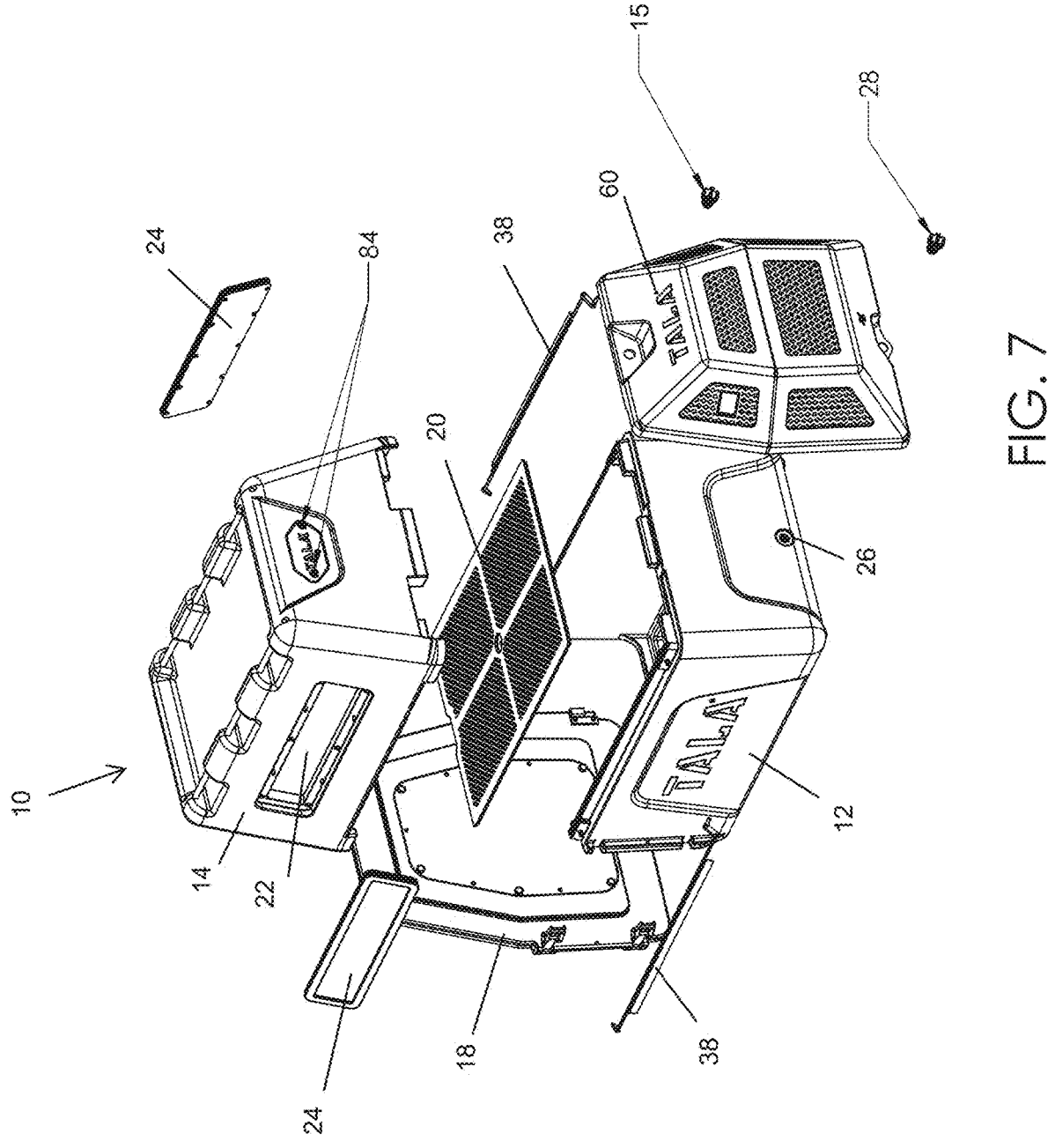
FIG. 7 is an exploded rear perspective view thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide an improved animal shelter and containment crate that provides climate control, temperature, and air quality monitoring, GPS, touch screen control and monitoring, cellular and Bluetooth connectivity for remote monitoring and control through a wireless device, as well as visual monitoring of the pet through video streaming for the pet enclosure. Aspects of the invention include a heating, ventilation, and air conditioning (HVAC) backpack that is configured to be coupled with a modular animal crate to provide a climate-controlled environment for an interior compartment within the modular animal crate.

As best seen in FIGS. 1-7, the modular animal crate 10 of the present invention is constructed of a plurality of insulated panels to form a shelter structure. The modular animal crate 10 includes a bottom crate half 12, a top crate half 14, a rear panel 16, and a front door panel 18, that may be joined by fasteners, such as thumb screws. A removable floor panel 20 is dimensioned to cover the interior floor surface of the bottom crate half 12. The plurality of insulated panels form an outer shell surrounding the interior compartment that is adapted to contain the animal within the modular animal crate 10.

The modular animal crate 10 provides security that your pet will be safe from any type of weather exposure. It is also collapsible, lockable, and portable so it can be used in a user's yard, vehicle, campgrounds, and other locations that may need temperature and weather protection. The modular animal crate 10 is also suitable for veterinary and animal control applications. The plurality of insulated panels may be formed of a rotational molded high-density polyethylene HDPE dual walled foam injected shell, provides for safety as well as noise control and containment of the animal.

The top crate half 14 includes a side window opening 22 that allows modular animal crate 10 to includes a removable window element 24. The removable window element 24 may include dual pane acrylic window 24 attachment for hot or cold environments that can be replaced with an open vented window element for more moderate weather conditions, where the outdoor temperatures are appropriate and safe for pets.

The modular animal crate 10 may also be readily converted from a shelter to a transport container. In a shelter configuration, the front door panel 18 may include a door flap element that is provided which allows the animal to enter and exit the crate as desired. In a transport or containment configuration, the door flap element is replaced with a front door panel 18. As with the removable window elements 24, the front door panel 18 may include a plexiglass or dual pane front door panel, or a custom HDPE open vented front door panel adapted for containment of the animal during occasions such as transport.

The bottom crate half 12 may include an under-floor compartment 25 that complements the HDPE or MDPE insulated shell to selectively provide cooling/heating to the interior to regulate the animal's temperature and safety. The floor panel 20 slides in to separate the pet from direct contact with a cooling source, such as ice/icepack and or a heat source. The floor panel 20 may be perforated to permit the cooling source and the heat source to transfer into the interior compartment of the modular animal crate 10. The perforated floor panel 20 also allow the animal's urine to flow to the under-floor compartment 25 to keep the urine from contacting the animal. In addition, the removable floor panel 20 makes it easy to clean the modular animal crate 10. A drain 26 and drain plug 28 may be provided in the bottom crate half 12 that permits containment draining and flushing of the under-floor compartment 26.

The modular animal crate 10 may also be thermally regulated with an under-floor compartment where icepacks or regular cubed ice can be stored for cooling. Alternatively, a heat source, such as a heat pad may be utilized to provide warmth in cold environments. In addition to these features, the HVAC backpack 60, shown in FIGS. 9-14B, and discussed in detail below has the capability to provide a climate-controlled environment within the modular animal crate 10.

The removable front door panel 18 also makes cleaning simpler and the disassembled crate structure smaller, which helps for shipping and storage purposes. The front door panel 18 also has a feature where you can remove the front panel within the rotational molded door frame and install a plurality of optional alternate panels to optimize for an individual's current weather conditions. These panels 18 can be disassembled and assembled by hand with the thumb screws provided, making it a no hassle process to adjust the modular animal crate 10 for the current climate. These attachments include but are not limited to, a dual pane front door panel, the open vent panel, and the dog door flap element.

The plexiglass door panel 18 and optional open vent panel 18 attachments are typically utilized for when the vehicle transporting the modular animal crate 10 is in motion. The front acrylic window provides light so the animal can see inside as well as an aesthetic appeal. A front dog door flap element is typically utilized for stationary applications and provides the animal the option to enter and exit the modular animal crate 10 structure at their leisure, while maintaining the inside temperature of the modular animal crate 10. The method for closing/latching the door may be provided which are preferably made of over-center latches 30, or elastomeric T-handle latches that are strong and ideal for easy access to the interior compartment of the modular animal crate 10, while securely containing the animal when desired. With the alternate door attachment feature, if the animal needs to be secure in a vehicle or elsewhere the full front acrylic window door or open vented frame window attachment is recommended. If the modular animal crate 10 is in a safe place where it would be okay for the animal to enter and exit the alternate door attachment with the dog door flap element is an option.

One of the multiple side window 24 attachment options is dual pane window panel 24 that may be an acrylic panel, which has a better insulating property than glass. It also is more durable, practical, and safe. The window opening 22 provides extra visibility to the interior of the modular animal crate 10. These side plexiglass windows can be selectively replaced with open vented special HDPE frame attachments, for more moderate climates.

The top crate half 14 may include a top rack 32 that is built into the rotational-mold and provides a shelf area for storage of items on top of the modular animal crate 10. The top crate half 14 may also include handles 34 for carrying the modular animal crate 10, while spaces between the handles 34 may be utilized for strapping down the modular animal crate 10 in a vehicle.

As will be appreciated from the present disclosure, the modular construction of the modular animal crate 10 allows the user to mixing the various modules for versatility in intended use, as a shelter, containment, and transport and also allows the user to configure the modular animal crate 10 to the climate and conditions in which the crate is used.

The user may pull on over-center latches 30, or T-handle 30 and unlatch them to open the door. Then slide the floor panel 20 out of the front, place ice/icepack/heat pad or other heating/cooling source in under floor compartment (optional). Slide floor panel back into crate. Depending on conditions, the user may or may not place a bed/pad in at this point. Put your animal in the crate. Close the door panel 18, pull the T-handles 30 over the latch receiver and double check to make sure the door panel 18 securely shuts. Make sure side vents 36 are completely clear of obstruction.

In more moderate climates one would open the front crate door panel 18 and using their hand, would unscrew thumb screws attaching the dual pane plexiglass windows, then install the open vent frame attachment in replacement of the dual pane plexiglass, then put the thumb screws back in.

If a person would want their pet to be able to enter and exit the crate freely, they would unscrew the thumb screws, using their hand, and replace, either the dual pane plexiglass attachment or the open vented frame attachment on the front door for the dog door flap element, then place in the dog-door dual flap element, reinstall the thumb screws, and shut the door to the crate, secure latches.

With the double pane windows and door panels installed, the modular animal crate 10 provides a shelter structure that is closed for containment of the heating and/or cooling airflow of the HVAC backpack 60. The modular animal crate 10 is made sufficiently breathable via a plurality of apertures 36 formed along a longitudinal length of a sidewalls of the modular animal crate 10. In the embodiment shown, the apertures 36 may be defined in a lateral sidewall of the modular animal crate 10 along the juncture between the top crate half 14 and the bottom crate half 12. A louver 38 is movably carried in the apertures and is selectively operable to open and close the apertures 36. The louver 38 may be manually operated via an actuator lever 40. The louver 38 is preferably moved to the closed position to when the HVAC backpack 60 is in operation to provide heating or cooling to the interior compartment of the modular animal crate 10.

Figures 8, 8A, 8B:
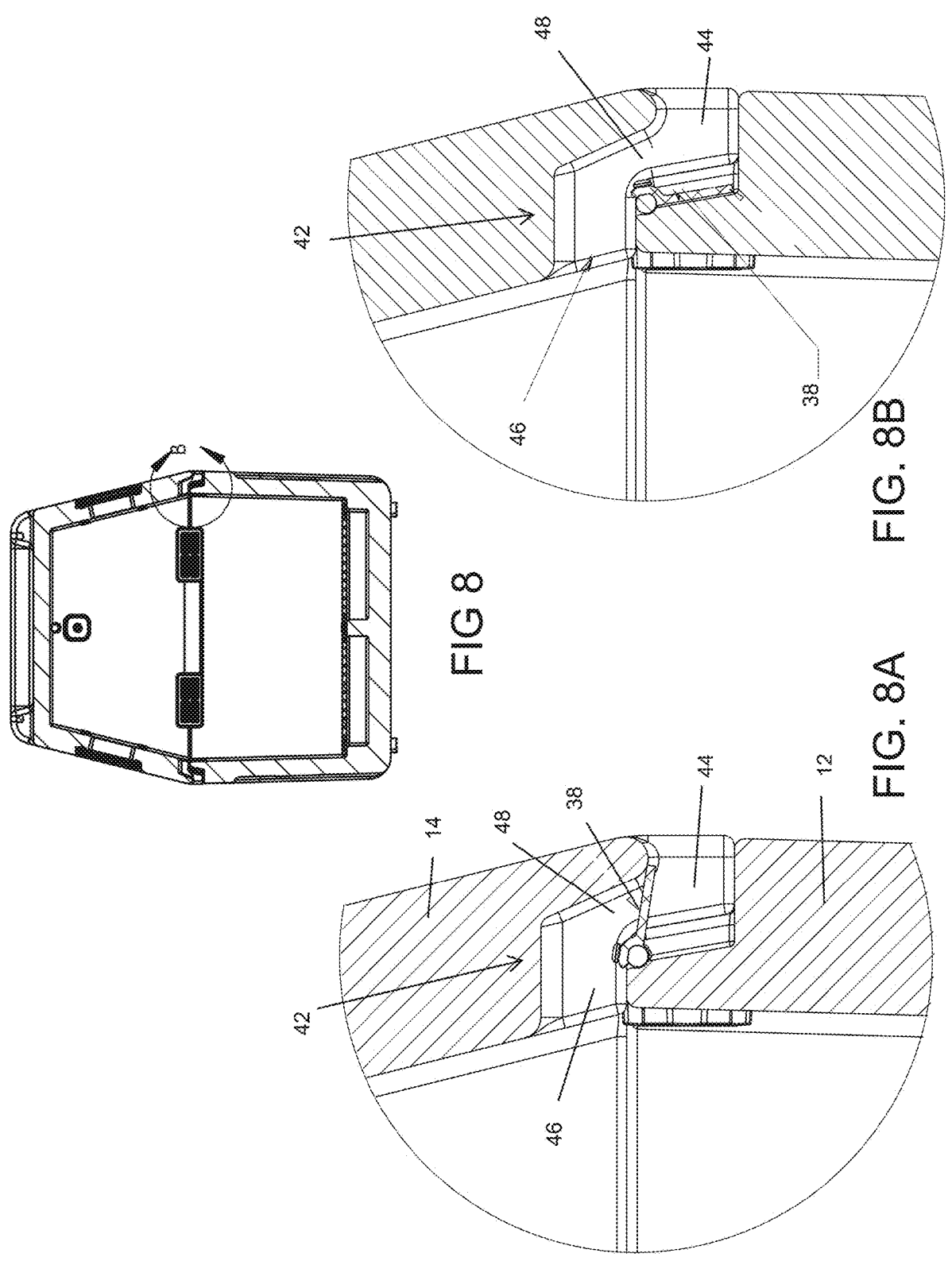
FIG. 8 is cross sectional view taken along line 8-8 of FIG. 5.
FIG. 8A is a detail cross sectional view showing a vent louver in a closed position.
FIG. 8B is a detail cross sectional view showing the vent louver in an open position.

The apertures 36 of the modular animal crate 10 are preferably one or more Z profile vents 42, as best seen in reference to FIGS. 8, 8A, and 8B. The Z profile vent 42 has an outer opening 44 that is positioned below an interior opening 46 of the Z profile vent 42. A vent channel 48 rises between the outer opening 44 and the interior opening 46. The Z profile vents 42 prevent the infiltration of wind and rain into the interior of the modular animal crate 10, while selectively allowing and blocking the circulation of air between the interior and exterior of the modular animal crate 10 via operation of the louver 38.

Figures 14, 14A, 14B:
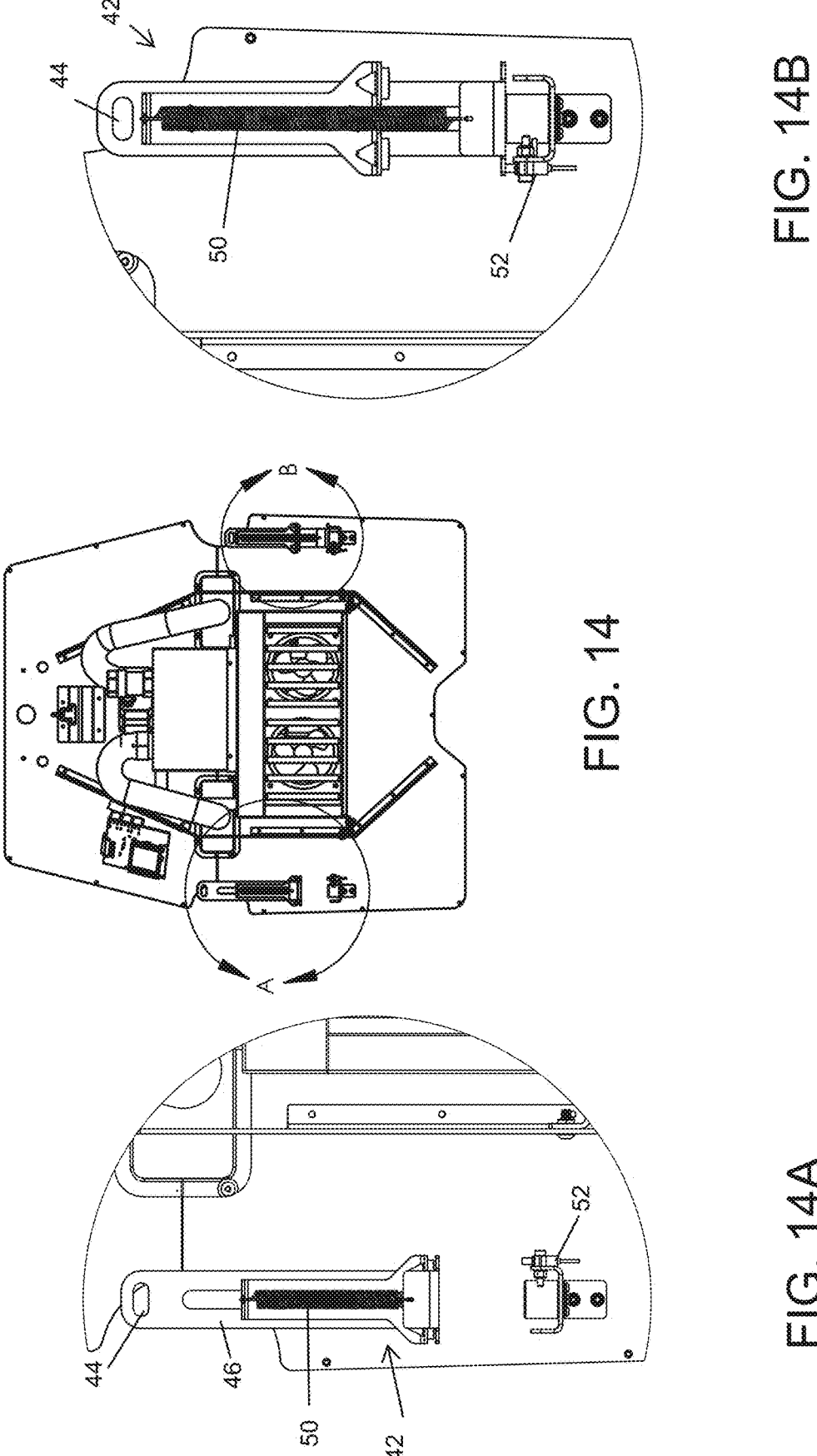
FIG. 14 is a rear elevation view of the HVAC backpack.
FIG. 14A is a detail view of a louver actuator shown in the open position.
FIG. 14B is a detail view of a louver actuator shown in the closed position.
Figure 15:
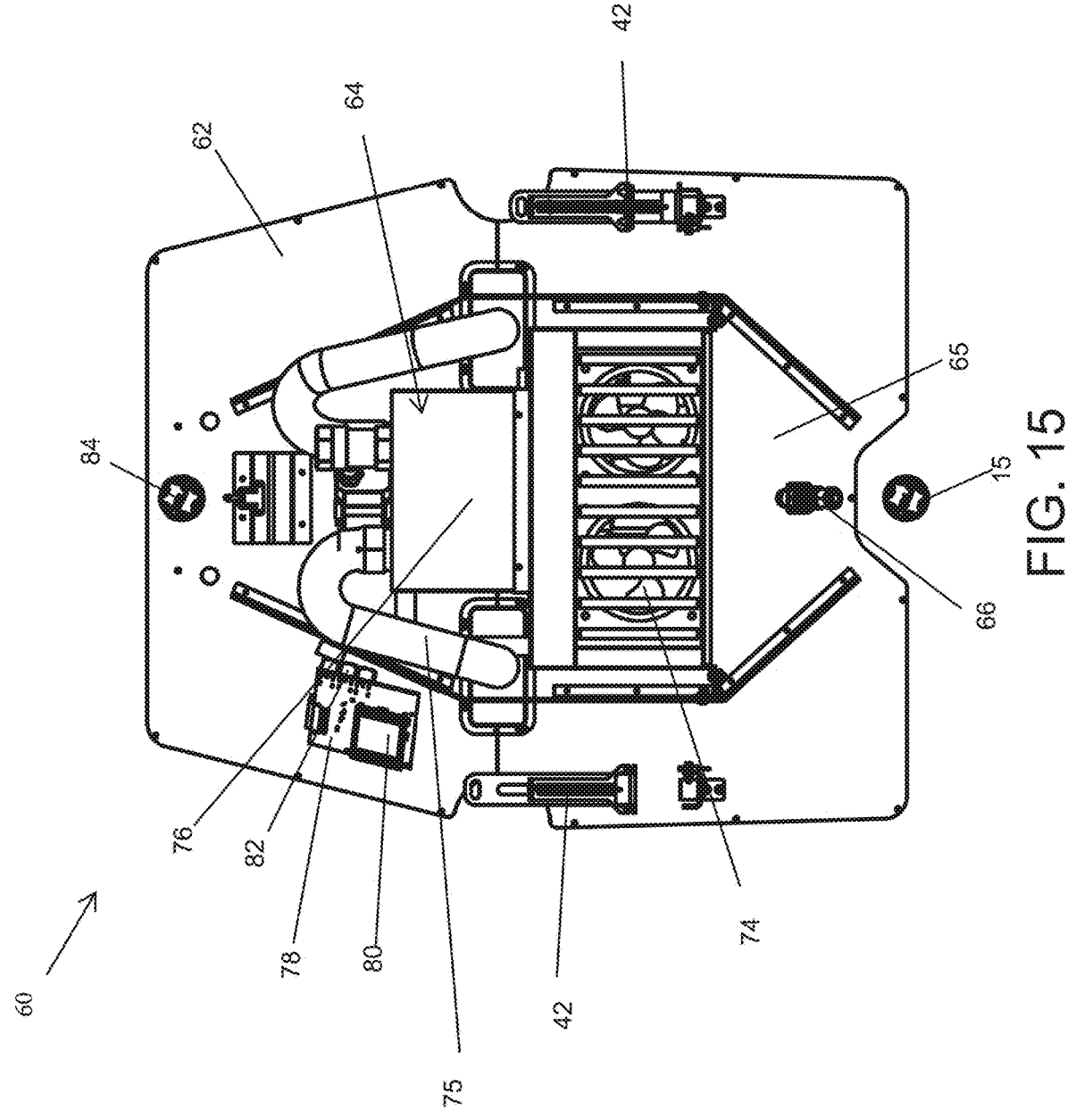
FIG. 15 is an enlarged rear elevation view of the HVAC backpack of FIG. 12.

As seen in reference to FIGS. 14, 14A, and 14B, the louver 38 may be automatically actuated via a failsafe mechanism. The failsafe mechanism is configured to automatically move the louver 38 to the open position in the event of a power failure in a motive force for actuating actuator 42 for the louver 38 so that the modular animal crate 10 is breathable for an animal contained within the modular animal crate 10.

In the embodiment shown, the failsafe mechanism may include an electro-mechanical actuator 42 that is operable responsive to a motive force between an open position, shown in FIG. 14A, and a closed position, shown in FIG. 14B. A slot 44 is defined in a movable plate 46 of the electro-mechanical actuator 42. A spring element 50 biases the movable plate 46 to the open position, such that the actuator lever 40 moves the louver to the open position. When activated, the electro-mechanical actuator 42 is energized to move the movable plate 46 to oppose the bias of the spring element 50. In the embodiment shown, the louver actuator lever 40, carried in the slot 44, operates the louver 38 between the open and closed positions. A limit switch 52 may be included to provide an identification to a control logic that the louver 38 is in the closed position. While the electro-mechanical actuator 42 shown is a linear actuator, the electro-mechanical actuator 42 may instead be a rotatory actuator. As will be appreciated, the actuator 42 may alternatively have a motive force such as a hydraulic, a pneumatic, an electro-hydro-mechanical motive force, or the like.

The HVAC backpack 60 is operable to provide an air-conditioned environment within the modular animal crate 10, where a custom micro-HVAC unit 64, such as a heat-pump, can attach to the back panel 16 of the modular animal crate 10, supplying adjustable and monitor-able climate-controlled airflow to the inside of the modular animal crate 10. The HVAC backpack 60 unit attaches similarly to a backpack (for reference) as a removable module that is coupled with the modular animal crate 10.

As best seen in FIGS. 9-13, the HVAC backpack 60 includes a framework 62 that supports the components of the HVAC unit 64 and provides a mounting bracket to couple the HVAC backpack 60 with the back panel 16 of the modular crate 10. The mounting bracket 62 may include an upper hook element that engages with a corresponding slot, such that the HVAC backpack 60 may be suspended in position and then be secured with one or more fasteners 15 to the modular animal crate 10.

The framework 62 may also support an internal battery 65 that powers the HVAC unit 64. Likewise, a power port 66 is provided for external powering of the HVAC unit 64. The power port 66 may be connected with a vehicle electrical system during transport or a household electrical supply when stationary. The power port 66 may also be utilized to recharge and condition the internal battery 65 so that it is available during power outages or when external power is not available.

The HVAC backpack 60 may utilize air inlet 68 and air outlet vent 70 to communicate conditioned air into and out of the modular animal crate 10. One or more of the air inlet 68 and the air outlet vent 70 may include a debris filter 72 to remove dust and particulates from the conditioned airflow. One or more fans 74 circulate an airflow over a heat exchanger 76 of the HVAC unit 64. Ducts 75 communicate air between the heat exchanger 76 and the air inlet 68 and the air outlet vents 70. The air inlet 68 and the air outlet vent 70 may be configured to protrude from a face of the framework 62 and be received within a corresponding opening in the rear panel 16 of the modular animal crate 10 to facilitate mounting of the HVAC backpack 60 and coupling of the air inlet 68 and the air outlet vent 70 with the interior of the modular animal crate 10.

The HVAC backpack 60 may include a control module 78 with a touchscreen display 80 to receive control inputs for operation of the HVAC unit 64 and provide a visual display of conditions within the modular animal crate 10. The control inputs may include the option to transfer to a fresh air supply that pulls air in from outside of the crate.

The micro-HVAC unit 64 is fully protected from the elements by its custom-made shell enclosure 82 made up of a dual walled HDPE or MDPE plastic, pressure injected with polyurethane foam.

The framework 62 may be coupled with the modular crate via one or more mounts 84, such as a post and slot, a tongue and groove, and the like. A quick release knob or fastener 15 is provided to secure the HVAC backpack 60 to the modular animal crate 10, such that operation of the quick release 15 allows the HVAC backpack 60 to be removed and secured with the modular crate 10 by operation of a single fastener 15.

The HVAC backpack 60 control module 78 includes connections with one or more sensors to monitor the air quality delivered to the modular crate 10. The framework 62 may also provide for a coupling with one or more sensors contained within the modular crate 10 for monitoring the air quality and environment within the crate 10. The one or more sensors may include a temperature sensor, an oxygen sensor, a carbon dioxide sensor, or any desired sensor providing an indication of the air quality of the modular crate 10. By way of non-limiting example, the one or more sensors may include a volatile organic compound (VOC) sensor for detecting the presence of hazardous chemical vapors within the modular crate 10 or an air source surrounding the crate 10. The one or more sensors may also include an audio and a video sensor 84, such as a camera, to provide for visual and/or audio monitoring of the animal contained within the modular animal crate 10.

The HVAC backpack 60 may also include a communications module to wirelessly communicate with a computing device. The computing device may include an app for monitoring one or more sensors, the audio, and the video feeds from the modular crate. The app may also include a user interface for control of the HVAC unit operation.

The control module 78 may also communicate one or more alerts when the environmental conditions deviate from a set condition, detection of a hazardous condition, or detection of specified animal activity within the crate 10. The alert may include one or more audio and/or visual signals coupled with the HVAC backpack 60, such as a horn, a buzzer, a flashing or a color-coded light signal. The control module 78 may also transmit the one or more alerts via the communications module 82, which may then be processed via the app for communicating the alert to the operator, such as an audio or visual signal on the computing device, or a messaging of the alert to the user.

As will be appreciated from the present disclosure, the HVAC backpack 60 can convert a pet containment crate 10 into a computerized smart crate, that can automatically regulate temperature, alert the owner of any concerns, feed the animal, have a camera for owner's visibility, and many other options. While principally a pet containment crate 10, the containment crate described herein could also be used to transport or contain different products that must be climate controlled.

It should be understood, of course, that the foregoing relates to exemplary embodiments of the invention and that modifications may be made without departing from the spirit and scope of the invention as set forth herein.

We claim:

1. A modular animal crate comprising:
   a plurality of insulated panels, each of the plurality of insulated panels formed of a thermoplastic material, the plurality of insulated panels defining an outer shell containing an interior compartment adapted for containment of an animal;
   at least one aperture formed along a longitudinal length of a lateral sidewall of the outer shell, the at least one aperture defining a Z profile vent within the lateral sidewall selectively communicating an airflow between an exterior of the outer shell with the interior compartment; and a louver received within the Z profile vent, the louver selectively operable between an open position and a closed position, wherein in the open position the airflow may be communicated between the exterior of the outer shell and the interior compartment, wherein in the closed position, communication of the airflow between the exterior of the outer shell and the interior compartment is blocked.

2. The modular animal crate of claim 1, further comprising:
a louver actuator lever selectively operable to move the louver between the open position and the closed position.

3. The modular animal crate of claim 2, further comprising:
an actuator coupled with the louver actuator lever, the actuator responsive to a motive force to selectively move the louver between the open position and the closed position.

4. The modular animal crate of claim 3, the actuator further comprising:
a failsafe mechanism in which the louver is moved to the open position with a removal of the motive force to the actuator.

5. The modular animal crate of claim 4, wherein the plurality of insulated panels comprises:
a top crate half, a bottom crate half, a rear panel and a front door panel.

6. The modular animal crate of claim 5, further comprising:
at least one window opening defined in a sidewall of the top crate half, the at least one window opening adapted to receive one of a dual pane window panel or a vented window element.

7. The modular animal crate of claim 6, the front door panel further comprising:
one of a dual pane front door panel, a vented front door panel, and a door flap element configured to allow the animal to selectively enter and exit the interior compartment.

8. The modular animal crate of claim 1, further comprising:
a heating, ventilation, and air conditioning (HVAC) backpack coupled with a back panel of the plurality of insulated panels of the outer shell, the HVAC backpack adapted to communicate conditioned air to the interior compartment of the modular animal crate via an air inlet and an air outlet vent defined through the back panel.

9. The modular animal crate of claim 8, further comprising:
one or more fans configured to circulate an airflow over a heat exchanger of the HVAC backpack; and
one or more ducts communicate the airflow between the heat exchanger and the air inlet and the air outlet vent.

10. The modular animal crate of claim 9, wherein the air inlet and the air outlet vents protrude from the HVAC backpack and are received within a corresponding opening in the back panel of the plurality of insulated panels of the outer shell of the modular animal crate.

11. The modular animal crate of claim 10, the HVAC backpack further comprising:
a control module; and
a touchscreen display configured to receive control inputs for operation of the HVAC backpack via the control module.

12. A modular animal crate comprising:
a plurality of insulated panels, each of the plurality of insulated panels formed of a thermoplastic material, the plurality of insulated panels defining an outer shell containing an interior compartment adapted for containment of an animal;
at least one aperture formed along a longitudinal length of a lateral sidewall of the outer shell, the at least one aperture defining a Z profile vent within the lateral sidewall selectively communicating an airflow between an exterior of the outer shell with the interior compartment; and
a heating, ventilation, and air conditioning (HVAC) backpack coupled with a back panel of the plurality of insulated panels of the outer shell, the HVAC backpack adapted to communicate conditioned air to the interior compartment of the modular animal crate via an air inlet and an air outlet vent defined through the back panel.

13. The modular animal crate of claim 12, further comprising:
one or more fans configured to circulate an airflow over a heat exchanger of the HVAC backpack; and
one or more ducts communicate the airflow between the heat exchanger and the air inlet and the air outlet vent.

14. The modular animal crate of claim 13, wherein the air inlet and the air outlet vent protrude from the HVAC backpack and are received within a corresponding opening in the back panel of the modular animal crate.

15. The modular animal crate of claim 14, the HVAC backpack further comprising:
a control module; and
a touchscreen display configured to receive control inputs for operation of the HVAC backpack via the control module.

16. The modular animal crate of claim 12, wherein the plurality of insulated panels comprises:
a top crate half, a bottom crate half, the back panel, and a front door panel.

17. The modular animal crate of claim 16, further comprising:
a louver received within the Z profile vent, the louver selectively operable between an open position and a closed position, wherein in the open position the airflow may be communicated between the exterior of the outer shell and the interior compartment, wherein in the closed position, communication of the airflow between the exterior of the outer shell and the interior compartment is blocked.

18. The modular animal crate of claim 17, further comprising:
a louver actuator lever selectively operable between an extended and a retracted position to move the louver between the open position and the closed position; and
an actuator coupled with the louver actuator lever, the actuator responsive to a motive force to selectively move the louver between the open position and the closed position.

19. The modular animal crate of claim 18, the actuator further comprising: a failsafe mechanism in which the louver is moved to the open position with a removal of the motive force to the actuator.

20. The modular animal crate of claim 16, further comprising:

at least one window opening defined in a sidewall of the top crate half, the at least one window opening adapted to receive one of a dual pane window panel or a vented window element.

21. The modular animal crate of claim 16, the front door panel further comprising:

one of a dual pane front door panel, a vented front door panel, and a door flap element configured to allow the animal to selectively enter and exit the interior compartment.

* * * * *